Figure 1:
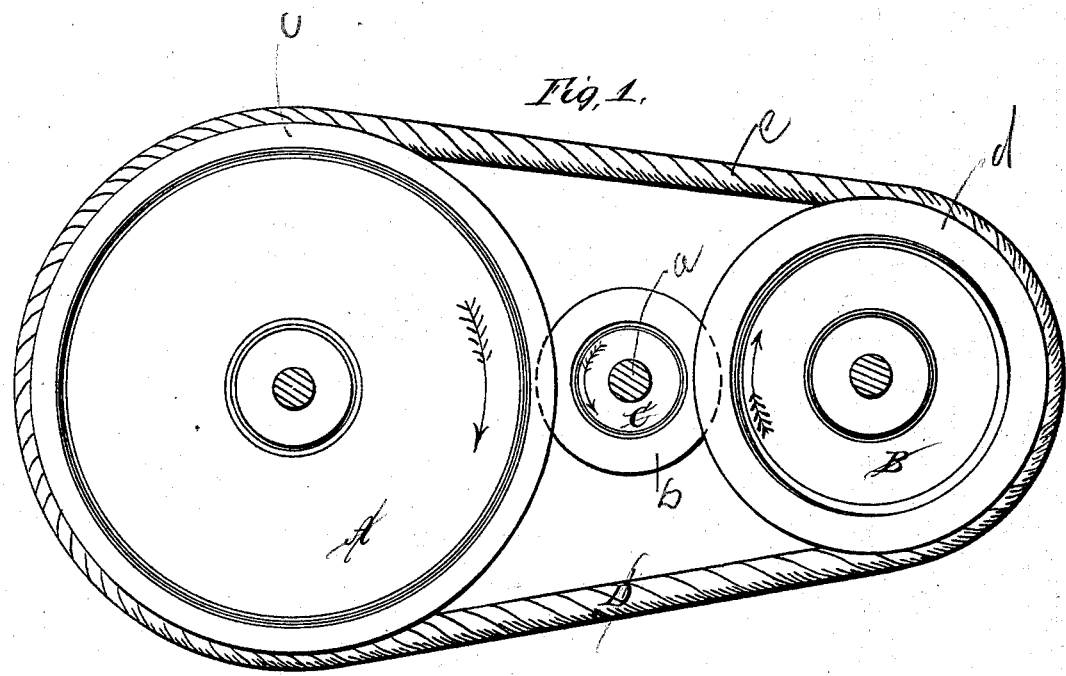

A. Hitchcock,
Machine Gearing,
No. 61,938. Patented Feb. 12, 1867.

Witnesses,
Danl W. Baldwin
A G Rogers

Inventor
Alonzo Hitchcock

United States Patent Office.

ALONZO HITCHCOCK, OF NEW YORK, N. Y.

Letters Patent No. 61,938, dated February 12, 1867; antedated January 30, 1867.

---

IMPROVEMENT IN MACHINE GEARING.

---

The Schedule referred to in these Letters Patent and making part of the same.

---

TO ALL WHOM IT MAY CONCERN:

Be it known that I, ALONZO HITCHCOCK, of the city of New York, in the county, and State of New York, have invented a certain new and useful Improvement in Machine Gearing; and I do hereby declare that the following is a full, clear, and exact description of the same, reference being had to the accompanying drawing, making a part of this specification, and to the letters of reference marked thereon.

The object of my invention is to distribute the application of rotary power to a shaft in such a way that there will be no tendency to displace the shaft from its bearings; and it consists in dividing the power, and in applying it by means of an elastic belt and gearing on each side of the shaft to be driven so that the thrust on one side counterbalances that on the other.

To enable others skilled in the arts to which it appertains to make and use my invention, I will proceed to describe its construction and operation with reference to the drawing, in which—

Figure 1 is a side view; and

Figure 2:
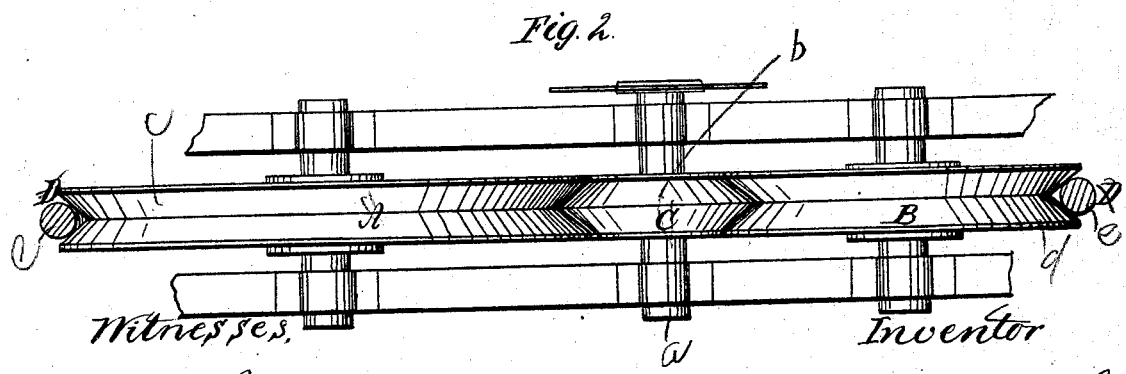

Figure 2, a plan of gearing arranged according to the said invention.

The shaft $a$, carrying, for instance, a circular saw, or connected with machinery, is the shaft that requires to be rotated. It is supported by journals working in bearings on the frame in the usual manner, and is furnished with a friction-wheel, $b$, that is driven at opposite points on its periphery by the corresponding friction-wheels $c$ and $d$. These wheels last mentioned are connected by a belt, $e$. Any application of power, therefore, to either of the shafts of the wheels $c$ or $d$, rotates them both in the same direction; and they each communicate to the opposite sides of the friction-wheel lying between their due share of power in opposite directions to produce the same rotary motion. With the driving-wheels rotating in the direction indicated by the arrows, the wheel $d$ tends to displace the shaft $a$, by lifting it; but at the same time the power communicated by $c$ also tends to depress it, and the one just counterbalances the other, so that the whole power applied is utilized in producing the rotary motion desired. The belt $e$, by which the power is distributed between the driving-wheels, should be elastic to compensate for wear and inaccuracies of workmanship; and the bearings of the driving-shaft should be allowed a little play for the same reason. There may be three, four, or more driving-wheels placed around the central shaft, to divide and balance the application of the power in a similar manner, but it is believed that two will be sufficient.

I am aware that it has been hitherto essayed to carry shafts on rollers by which the friction has been converted into a rolling motion, and diminished in proportion to the diameters of the anti-friction wheels and their axles; but such an arrangement differs from my invention in the respect that I divide the power, and apply it on opposite sides of the shaft to be driven, so that there is theoretically no friction of the shaft to be diminished, and the driving-wheels might as well be cog-wheels as any other if they could be perfectly made and to work without noise.

I claim as my invention—

Distributing the power around the shaft to be driven, so that the tendency to displace the shaft on one side is counteracted by that on the other by the means and in the manner substantially as described.

A. HITCHCOCK.

Witnesses:
   THOMAS DAY,
   WM. KEMBLE HALL.